(12) United States Patent
Kochan, Jr. et al.

(10) Patent No.: US 9,033,686 B2
(45) Date of Patent: May 19, 2015

(54) STRAIN GAUGE PUMP CONTROL SWITCH

(71) Applicant: Metropolitan Industries, Inc., Romeoville, IL (US)

(72) Inventors: John R. Kochan, Jr., Naperville, IL (US); Casey Barker, Plainfield, IL (US)

( * ) Notice: Subject to any disclaimer, the term of this patent is extended or adjusted under 35 U.S.C. 154(b) by 0 days.

(21) Appl. No.: 13/956,000

(22) Filed: Jul. 31, 2013

(65) Prior Publication Data

US 2014/0017095 A1 Jan. 16, 2014

Related U.S. Application Data

(62) Division of application No. 12/123,850, filed on May 20, 2008, now Pat. No. 8,591,198.

(60) Provisional application No. 60/939,453, filed on May 22, 2007.

(51) Int. Cl.
*G01F 23/14* (2006.01)
*G01F 23/18* (2006.01)
*F04B 49/06* (2006.01)

(52) U.S. Cl.
CPC .............. *G01F 23/14* (2013.01); *G01F 23/18* (2013.01); *F04B 49/06* (2013.01)

(58) Field of Classification Search
CPC ... F04D 13/086; F04D 15/0218; F04B 49/06; G01F 23/14; G01F 23/18; H01H 35/24; H01H 35/26; H01H 35/34; H01H 35/245; H02H 1/043; H02H 7/08; H02H 7/0855; G01L 7/08; G01L 7/084; G01L 9/0002; G01L 9/006; G01L 9/0064; G01L 9/04

USPC .............. 417/36, 38, 44.2, 44.4, 44.9, 423.3; 200/81 R, 83 R; 73/720, 726, 168
See application file for complete search history.

(56) References Cited

U.S. PATENT DOCUMENTS

| | | | | |
|---|---|---|---|---|
| 3,234,881 A * | 2/1966 | Ekey | ............................... | 417/38 |
| 3,307,000 A * | 2/1967 | Ekey | ........................... | 200/83 Y |
| 3,461,416 A * | 8/1969 | Kaufman | .......................... | 338/4 |
| 3,724,274 A * | 4/1973 | Millar | ............................. | 73/726 |
| 4,385,525 A * | 5/1983 | Phillips et al. | .................. | 73/720 |
| 4,754,108 A * | 6/1988 | Akhter | ........................ | 200/84 R |
| 4,845,322 A * | 7/1989 | Iwakiri et al. | ............... | 200/81 R |
| 5,633,540 A * | 5/1997 | Moan | ............................ | 307/126 |
| 5,672,050 A * | 9/1997 | Webber et al. | .................. | 417/18 |
| 5,815,079 A * | 9/1998 | Getman et al. | ............... | 340/620 |
| 6,867,383 B1 * | 3/2005 | Currier | ........................ | 200/83 R |
| 7,307,538 B2 * | 12/2007 | Kochan, Jr. | .................... | 340/618 |
| 7,755,318 B1 * | 7/2010 | Panosh | .......................... | 318/778 |
| 2002/0093306 A1 * | 7/2002 | Johnson et al. | ............... | 318/782 |
| 2003/0107509 A1 * | 6/2003 | Drossel | ......................... | 341/155 |
| 2004/0009075 A1 * | 1/2004 | Meza et al. | ...................... | 417/32 |
| 2006/0042394 A1 * | 3/2006 | Kosh et al. | ....................... | 73/753 |
| 2008/0229819 A1 * | 9/2008 | Mayleben et al. | ........... | 73/304 C |

* cited by examiner

*Primary Examiner* — Devon Kramer
*Assistant Examiner* — Thomas Fink
(74) *Attorney, Agent, or Firm* — Husch Blackwell LLP

(57) ABSTRACT

A control switch incorporates a solid state transducer, a strain gauge. The transducer responds to a local environmental condition, such as fluid level, or pressure and exhibits a parameter change which can be detected as an electrical output. Control circuits coupled to the transducer can sense the parameter change and switch a source of electrical energy to a load in response thereto.

9 Claims, 4 Drawing Sheets

STRAIN GAUGE PUMP CONTROL SWITCH

CROSS-REFERENCE TO RELATED APPLICATION

This application is a divisional of U.S. patent application Ser. No. 12/123,850 filed May 20, 2008 and entitled "Strain Gauge Pump Switch" which claims the benefit of the filing date of U.S. Provisional Application Ser. No. 60/939,453 filed May 22, 2007 and entitled "Strain Gauge Pump Switch". The disclosures of these applications are fully incorporated herein by reference.

FIELD

The invention pertains to solid state pump control switches. More particularly, the invention pertains to such switches which incorporate a strain gauge as a transducer to convert an environment condition, such as a level of a fluid, to an electrical signal.

BACKGROUND

Various types of switches have been developed for use in turning pumps on and off in response to an external ambient condition, such as water level. Such switches tend to be used in relative harsh environments such as in tanks of water, or, sump pits which are used to collect foundation water. Other environments include industrial fluids which might be caustic or acidic, as well as high or low temperatures.

While known switches can be useful and function properly over a period of time, they are always subject to failure. Switch failures in turn translate into non-running pumps which can result in flooded commercial, industrial and residential locations. Alternately, non-running pumps can result in water supply deficiencies, or failures to supply commercial or industrial fluids for various applications.

One switch configuration has been disclosed in U.S. Pat. No. 7,307,538, issued Dec. 11, 2007, and entitled "Pump Connector System". The '538 Patent is assigned to the assignee hereof and is incorporated herein by reference.

There is an on-going need for control switches usable in such environments which exhibit greater reliability and longer lifetimes than do known switches. Preferably, such improved switches would be price competitive with known switches and readily substitutable therefore.

DETAILED DESCRIPTION

Figure 1:
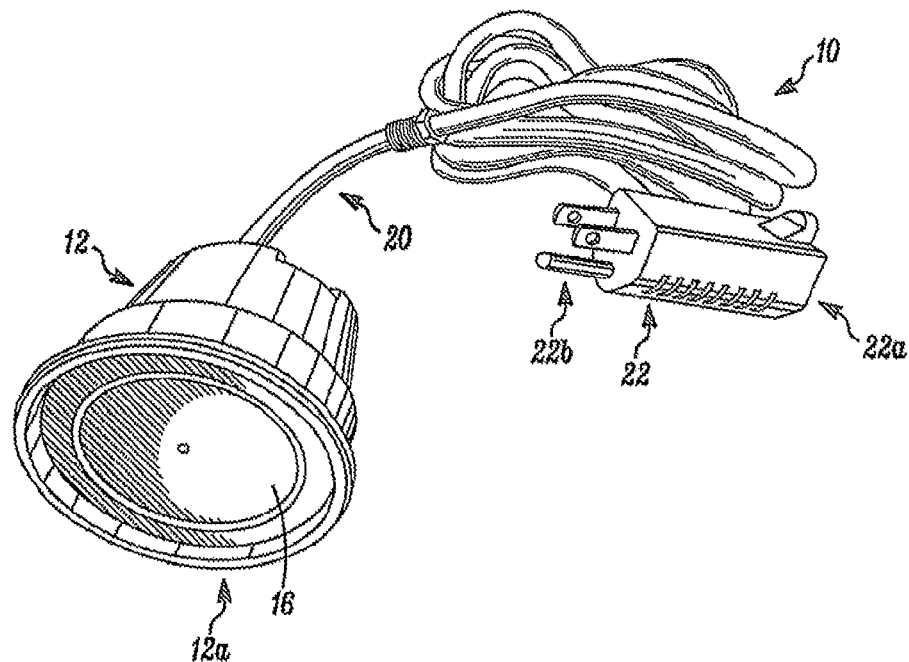
FIG. 1 is a diagram of a switch assemblage in accordance with the invention.
Figure 2:
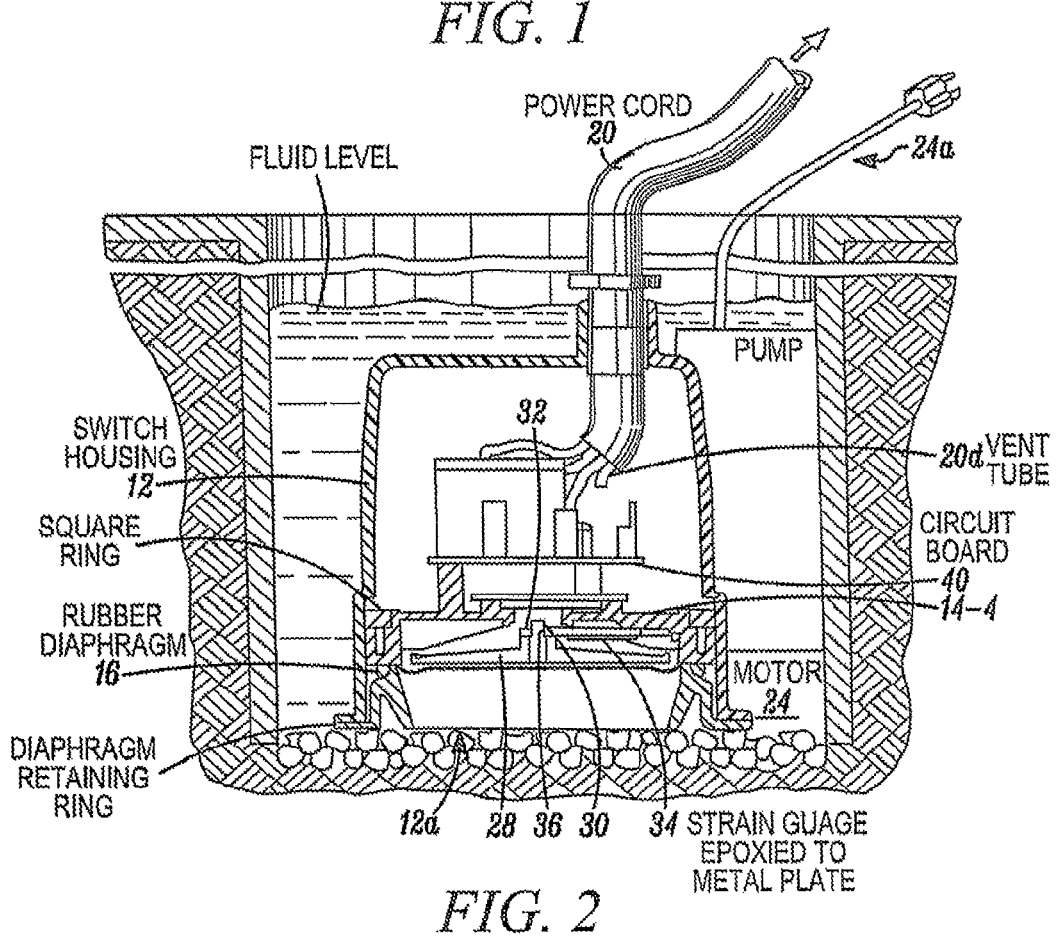
FIG. 2 is a side sectional view of an exemplary switch housing as in FIG. 1.
Figure 3:
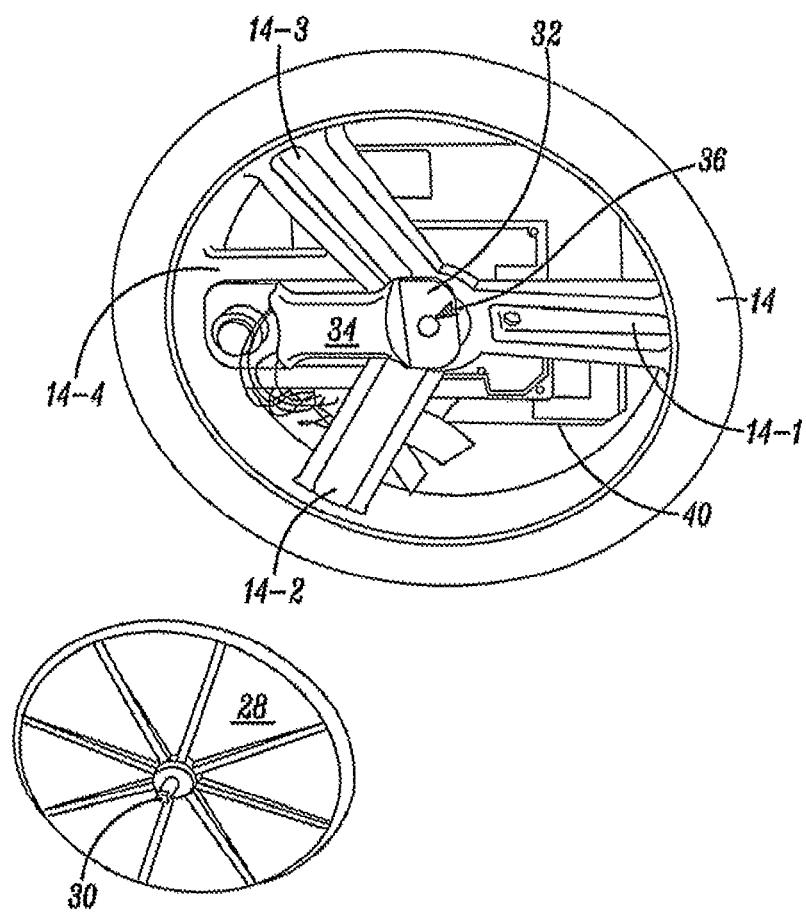
FIG. 3 is an end view of an embodiment of a transducer in accordance with the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of the invention incorporate a strain gauge as a transducer to sense the presence of a fluid either through displacement, buoyancy of a structure or by fluid pressure deforming a strain gauge platform. Such embodiments can be implemented as solid state structures which can be digitally calibrated for various settings or pressure.

In one aspect of the invention, such transducers can be coupled to electronic control and switching circuitry which can switch electrical energy to activate a load, such as an electric motor for a pump. Advantageously, motor starting inrush currents are diverted away from the transducers in such embodiments. Further, such transducers can accurately respond to changing conditions, such as level or pressure, resist vibration and can withstand harsh operating environments.

The control and switching circuitry can include relatively high power semiconductor switches which are controlled by one or more programmable processors which in turn are coupled to one or more solid state transducers, preferable strain gauges. The processor(s) can digitally calibrate one or more strain gauges.

In another aspect of the invention, a solid state switch, such as a triac, can be coupled in parallel with a relay to a pump motor connector. The switch and relay can be independently controlled by control circuits in the unit. In response to signals from the strain gauge, the control circuits can bias the switch to a low impedance state to couple electrical energy to the pump connector. In this state, the switch can couple the motor start up, inrush, current without arcing or the like to the pump connector to start the motor. Once the inrush currents have subsided, for example after a time interval such as two or three seconds, the control circuits can activate the relay which changes state and provides a closed contact pair to carry the motor current as an alternate to the solid state switch. The relay contacts shunt the motor current away from the switch enabling it to cool off as needed.

When the strain gauge indicates that the lower water level has been reached, the control circuits de-energize, turn off, the relay which open circuits the motor current circuit through those contacts. Subsequently, after another time interval, such as two or three seconds, the solid state switch is biased off, or placed in a high impedance state by the control circuits. When the switch turns off it, and not the relay contacts, absorbs any turn off current or voltage transients which might otherwise cause arcing at the relay contacts. Those contacts are thus protected from electro-ablation, contact burning.

With respect to FIGS. 1-4, a pump control system 10 includes a water tight housing 12 with an open end 12a closed by diaphragm 16. A ring 14 is located in the housing 12 between the diaphragm 16 and a circuit board 40. Housing 12 is placed in the sump along with a pump having a motor 24 to be switched on and off.

Figure 4:
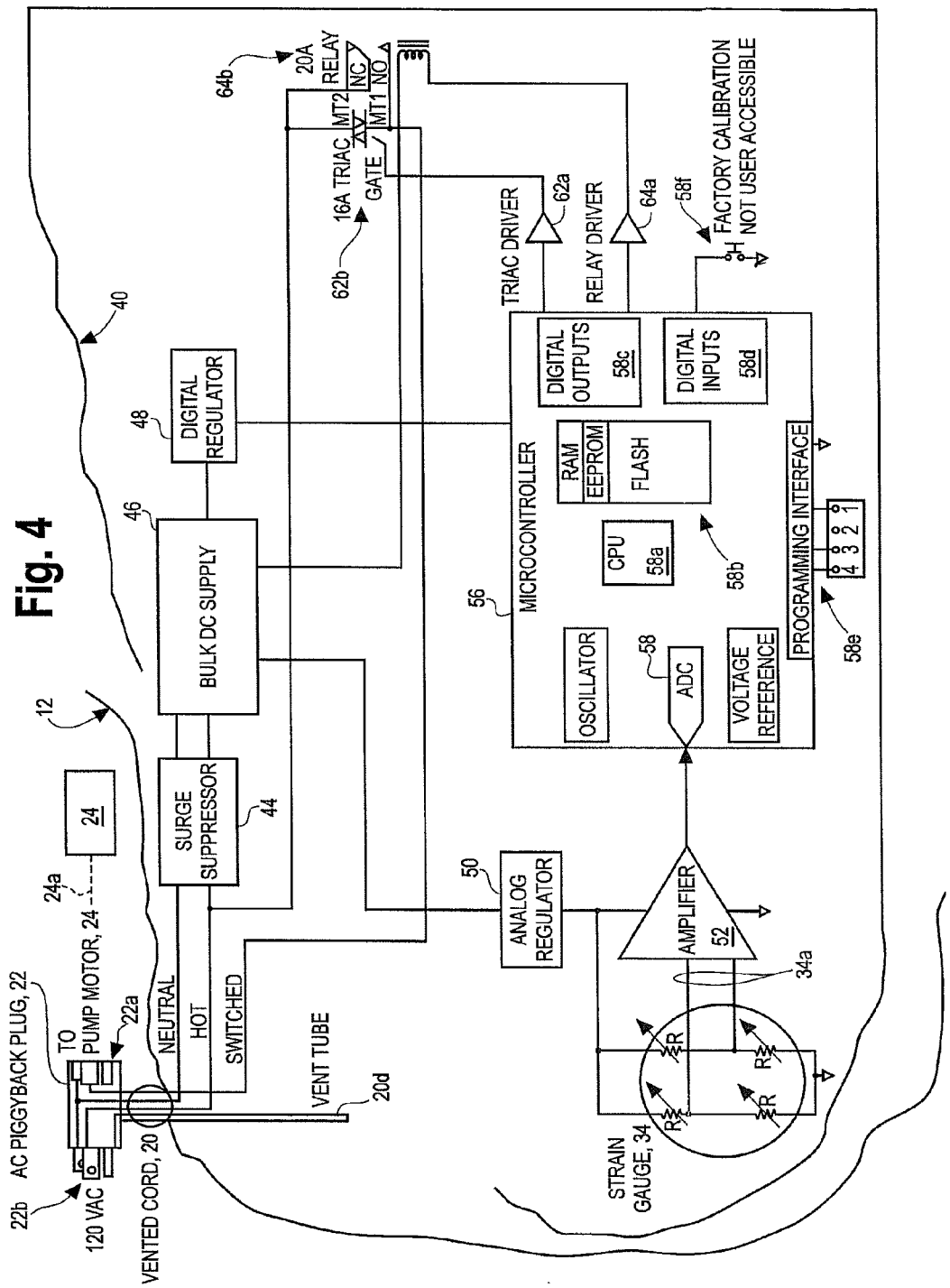
FIG. 4 is a block diagram of control circuits in accordance with an embodiment of the invention.
Figure 4A:
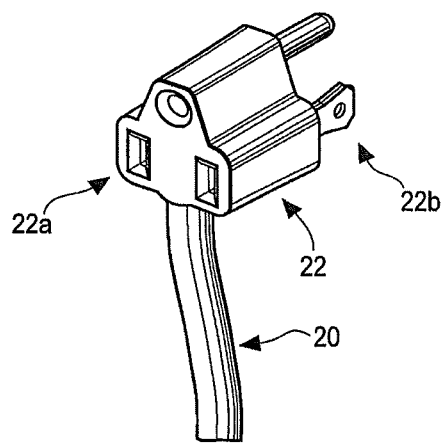
FIG. 4A is a perspective view of an electrical cable and AC connector in accordance with the invention.

An electrical cable 20 couples housing 12 to a double sided AC connector 22. As shown in FIG. 4A, connector 22 carries a pump AC receptacle 22a at one end and AC outlet prongs 22b at the other end. In operation, a pump AC connector is plugged into receptacle 22a. Prongs 22b are plugged into a local utility supplied AC outlet.

The ring assembly 14 has an annular shape with molded radial members 14-1, -2, -3, and -4. Radial member 14-4 carries an elongated, deflectable, metal plate 32 which supports a strain gauge 34. A pressure sensing plate 28 carries a connector prong 30. A centered perforation 36 in a free end of plate 32 receives the connector prong 30 with a friction fit and supports pressure plate 28 for axial motion in response to applied fluid pressure.

A printed circuit board 40 carries sensing and control circuits 42. Surge suppressing circuits 44 are coupled to a DC supply 46. A digital circuit regulator 48 and analog circuit regulator 50 feed digital circuits 56 and differential amplifier 52 respectively.

The differential amplifier 52 is coupled to strain gauge 34 via connectors 34a. Movement of the plate 28 in a first direction in response to increasing fluid pressure generates a signal of a first polarity at amplifier 52. Movement of plate 28 in the opposite direction, in response to decreasing fluid pressure generates a signal of the opposite polarity at amplifier 52.

Digital control circuits 56 include a programmable processor or computer 58a, and associated storage, random access memory, EEPROM and Flash memory indicated generally at 58b. Software, or, control programs stored in EEPROM or Flash memory can be executed by processor 58a in carrying out the above described switching process.

Circuits 56 can be accessed via a programming interface 58e. A factory calibration port 58f is also provided.

Digital output circuits 58c are respectively coupled to Triac driver 62a and Triac 62b, and relay driver 64a and relay 64b. As described above, electrical energy from connector 22 is switched by Triac 62b and relay 64b to provide a switched AC output 20c which can be coupled to pump motor 24 via pump receptacle end 22a.

A vent tube 20d extends from within housing 12, via cable 20 and terminates at connector 22. Tube 20d maintains pressure in the housing 12 at local atmospheric pressure.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A control system for an electric motor comprising:
   a watertight housing;
   a vent tube with first and second ends, the first end is coupled to the housing and the second end extends away from the housing;
   an elongated, radially oriented a strain gauge carried in the housing;
   control circuits coupled to the strain gauge and responsive to an output of the strain gauge;
   a relay and an electronic switch coupled to and independently controlled by the control circuits;
   an electrical connector for a motor, the electrical connector for the motor having prongs and receptacles;
   the second end of the vent tube located adjacent to each of the electrical connector, an output from the relay, and an output from the electronic switch;
   the electronic switch and the relay are directly electrically connected in parallel between at least one of the prongs and at least one of the receptacles of the electrical connector for the motor;
   the control circuits, responsive to the output of the strain gauge, sequentially:
   (i). place the electronic switch into a conducting state to couple an electric motor start up, inrush current, without arcing, from the at least one prong, through the electronic switch, to the at least one receptacle to start the motor; and
   (ii). once the inrush current has subsided, changing the state of the relay to provide a closed contact pair that carries the motor current from the at least one prong, through the relay, to the at least one receptacle as an alternate, parallel path to operate the motor.

2. A system as in claim 1 which includes a bridge circuit, at least one branch of the bridge circuit is coupled to a differential amplifier.

3. A system as in claim 1 where the control circuits include a programmable processor and associated control software stored on a computer readable medium.

4. A system as in claim 3 which includes first software that monitors at least one electrical signal from the strain gauge.

5. A system as in claim 4 which includes second software, responsive to at least one electrical signal from the strain gauge that carries out a pump turn-on sequence.

6. A system as in claim 5 where the pump turn-on sequence includes:
   causing the electronic switch to enter a low impedance state;
   establishing a first time interval;
   responsive to a termination of the first time interval, causing the relay to go from a non-conducting to a conducting state.

7. A system as in claim 6 which includes pump turn-off software responsive to at least one electrical signal from the strain gauge.

8. A system as in claim 7 where the pump turn-off software includes;
   causing the relay to return to the non-conducting state;
   establishing a second time interval;
   responsive to a termination of the second time interval, causing the electronic switch to enter a high impedance state.

9. A system as in claim 1 wherein the control circuits respond to electrical output signals from the strain gauge indicate of movement of a free end thereof.

* * * * *